Nov. 10, 1970 G. P. PASTERNACK 3,539,727
BATTERYLESS DATA RECEIVER HAVING POWER SUPPLY ISOLATION
BETWEEN DETECTION CIRCUITS AND SIGNAL OUTPUT
Filed Feb. 10, 1969
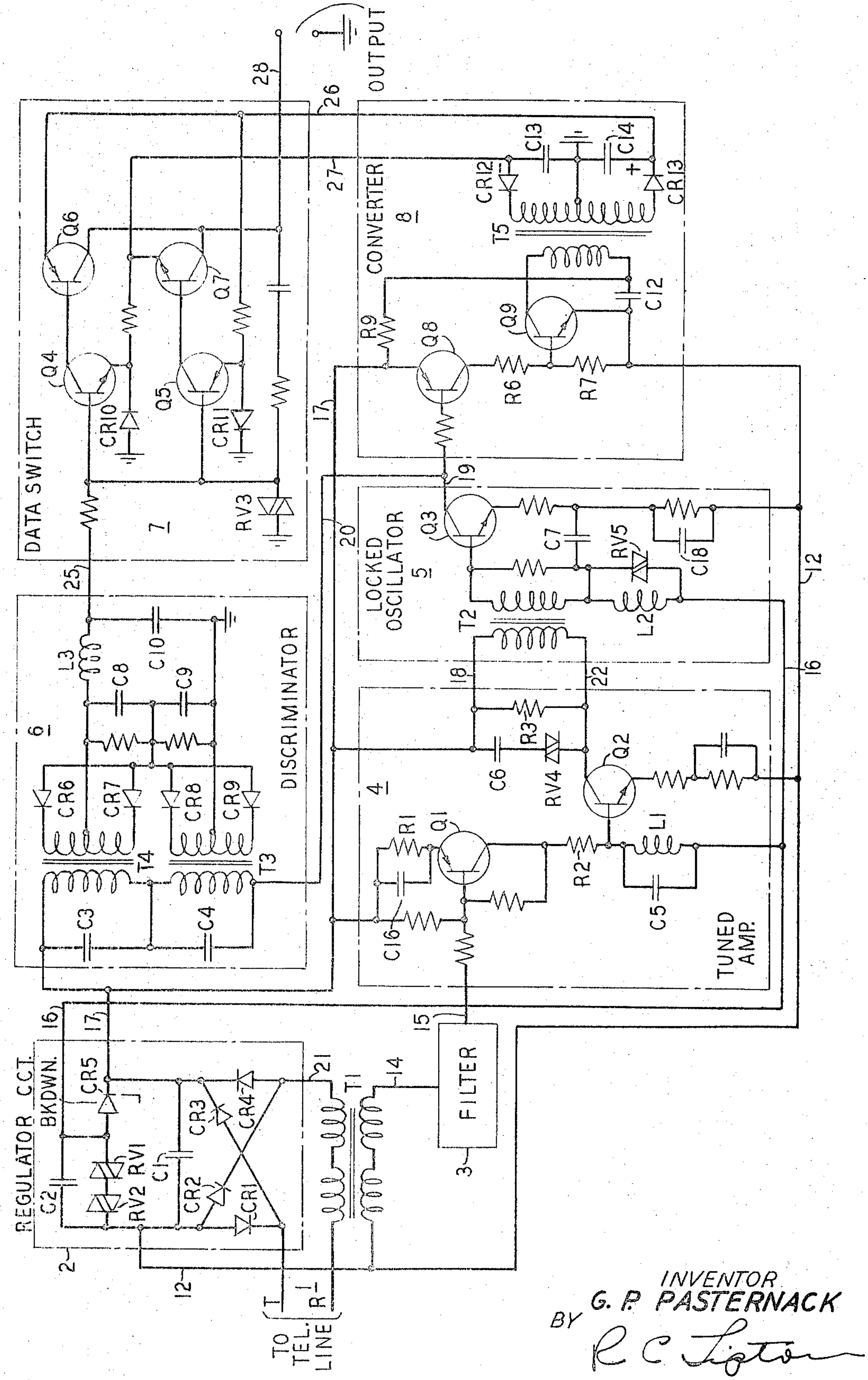
INVENTOR
G. P. PASTERNACK
BY R C Lipton
ATTORNEY United States Patent Office 3,539,727

Patented Nov. 10, 1970

3,539,727

BATTERYLESS DATA RECEIVER HAVING POWER SUPPLY ISOLATION BETWEEN DETECTION CIRCUITS AND SIGNAL OUTPUT

Gerald P. Pasternack, Colts Neck, N.J., assignor to Bell Telephone Laboratories, Incorporated, Murray Hill, N.J., a corporation of New York Filed Feb. 10, 1969, Ser. No. 797,826
Int. Cl. H04m 11/06
U.S. Cl. 179—2 7 Claims

ABSTRACT OF THE DISCLOSURE

Frequency-shift data signals received from a telephone line are limited by a locked oscillator, recovered by a discriminator, converted to signal voltages by a switching circuit operated by the discriminator and applied to a customer provided terminal. The power supply for circuits is derived from the telephone line current developed by the central office battery. The signal voltages on the customer provided terminals are developed with respect to the local customer ground and are, therefore, isolated from the central office battery. Isolation of the power supply of the switching circuit is provided by coupling the alternating signal output of the oscillator limiter through a transformer and rectifying the alternating signal with respect to local ground to obtain the supply voltage.

FIELD OF THE INVENTION

This invention relates to batteryless data signal receivers which derive energy from a central office battery by way of a telephone line and, more particularly, to power supply circuits which convert the telephone line current from the central office battery to voltage supplies which may be used to supply energy to local signaling circuits.

DESCRIPTION OF THE PRIOR ART

The telephone network is now interconnecting various types of business machines, computers and data processors, etc. in addition to the conventional telephone sets. The business machine subscriber customarily requests that the telephone company provide equipment for accepting data signals from a customer provided sending terminal and for applying the signals to the telephone line and equipment for receiving data signals from the telephone line and for applying them to a customer provided receiving terminal. This equipment, sometimes called a data set, is preferably arranged to convert data signal voltages provided by the customer to voice signals (such as frequency-shift signals) and to convert frequency-shift data signals to signal voltages suitable for the customer.

The telephone company must, of course, supply power for the data set and it may not be feasible to obtain the power from the customer's premises. It is known, in this event, to obtain energy from the telephone line current which is, in turn, derived from the central office battery. However, the signal voltages applied to the customer provided receiving terminal must be developed with respect to the ground return of the business machine. Therefore, these signal voltages and the circuit that generates them have to be isolated from the common return of the central office battery.

Converters are known, in the prior art, which obtain a voltage supply from a source of energy and, in addition, isolate the supply from the energy source. One arrangement, known as a DC-to-AC-to-DC converter, includes an oscillator which utilizes the energy from the source to generate an alternating current wave. The A.C. wave is then passed through a transformer which acts to preclude D.C. coupling therethrough. The resultant A.C. wave is then rectified, producing a D.C. voltage supply isolated from the energy source. The cost of the circuit components for this conversion is very high, however, in view of the total cost of a data set.

Accordingly, it is an object of this invention to provide an improved converter for producing a voltage supply derived from, while isolated from, an energy source. It is a further object of this invention to simplify and reduce the cost of converters of this type which supply power for A.C. signaling circuits.

SUMMARY OF THE INVENTION

In accordance with the present invention, the power supply for the circuit generating the signal voltages is derived from, but isolated from, the central office battery through the utilization of a converter which includes a transformer to preclude D.C. coupling therethrough. It is a feature of this invention that the alternating current wave to be transformer coupled to the rectifier in the converter is obtained from the data set signal receiving circuit. In the illustrative embodiment disclosed herein, the incoming frequency-shift data signal received from the telephone line is advantageously applied to a locked oscillator which provides sinusoidal limiting to generate an alternating current signal locked to the frequency of the incoming data signal. This limited signal is passed to a discriminator which recovers the data signal from the frequency-shift line singal. The discriminator operates an output switch energized by the isolated voltage supply to produce the data signal voltages for the subscriber. At the same time, the limited alternating current signal wave of the oscillator is passed to the transformer coupling in the converter. Thus, the need for an oscillator in the converter to generate an alternating current wave is eliminated.

BRIEF DESCRIPTION OF THE DRAWING

The foregoing summary and other objects and features of this invention will be more fully understood from the following description of an illustrative embodiment thereof taken in conjunction with the accompanying drawing which discloses a data set receiving circuit and voltage supplies therefore in accordance with this invention.

DETAILED DESCRIPTION

Referring now to the drawing, incoming signals and supply power are received over telephone line 1. The signals are passed through transformer T1 and filter 3 to the receiving circuits which may typically comprise tuned amplifier 4, locked oscillator 5, discriminator 6 and data switch 7. These receiving circuits operate to detect the incoming signals and apply them to outgoing lead 28. The incoming supply power on telephone line 1 is developed across regulator 2 which provides a voltage supply for the receiving circuits. As described in detail hereinafter, the signal power on lead 28 is derived from, but isolated from, telephone line 1. The development of the isolated power is provided by converter 8 together with locked oscillator 5, as described hereinafter.

Telephone line 1 extends to a telephone central office, not shown. The telephone line consists of tip lead T and ring lead R and typically has applied thereon by the central office a supply current derived from the central office battery and a superimposed alternating current, the alternating current designating the incoming mark and space signal frequencies. Outgoing lead 28 preferably extends to equipment (not shown) for recording the data impressed on lead 28. Advantageously, the equipment is locally grounded to the same ground return provided for the signal power on lead 28, as described hereinafter, thus permitting the local equipment to cooperate with lead 28 and respond to the data signals impressed thereon. The circuits in the drawing thus constitute the receiving portion of a data set. It is, of course, apparent that the data set may further include transmitting circuits and that the voltage supply for those circuits may also be provided by regulator 2.

Ring lead R passes through the primary side of transformer T1 and then by way of lead 21 to regulator circuit 2. Tip lead T is directly connected to regulator circuit 2. Regulator circuit 2 serves to provide the necessary supply voltages for the data set receiver as derived from the current supplied from the central office battery by way of telephone line 1. As described in detail hereinafter, regulator circuit 2 provides a common return on lead 12 and with respect thereto develops positive voltage supplies on leads 16 and 17. In accordance with the embodiment disclosed herein, the supply passed to lead 16 is approximately two volts positive with respect to common return lead 12, and the voltage supply passed to lead 17 is approximately ten volts positive with respect to lead 12.

The superimposed alternating current data signals on telephone line 1 which are passed through the primary winding of transformer T1 are developed across the secondary of transformer T1, which is in turn connected across lead 14 and common return lead 12. Accordingly, the data signals are passed via lead 14 to filter 3 and then by way of lead 15 to the tuned amplifier generally indicated by block 4.

It is seen that common return lead 12 and power supply lead 17 extend to tuned amplier 4 to provide the appropriate power supply. Lead 16 is also connected to tuned amplifier 4, providing appropriate biasing for the circuit. Thus, as described in detail hereinafter, with incoming signals on lead 15 and voltage supply on leads 12, 16 and 17, marking and spacing tone signals are amplified, filtered and developed across leads 18 and 22 by tuned amplifier 4 and then passed to locked oscillator 5.

The output of locked oscillator 5 is connected by way of leads 19 and 20 to discriminator 6 and then by way of discriminator 6 to the power supply on lead 17. Common return lead 12 is also connected to locked oscillator 5, as is biasing lead 16. With signals applied thereto by tuned amplifier 4 and supply voltages by leads 12, 16 and 17, locked oscillator 5 functions to provide, as described in detail hereinafter, an oscillating or tone signal locked to the frequency of the incoming mark or space signals and, further, to provide an oscillating or tone frequency in the absence of incoming signals so long as power is derived from telephone line 1. In any event, the tone or oscillating signals are passed by way of lead 20 to discriminator 6 and, in addition, passed via lead 19 to converter 8. These tone signals provide two separate and independent functions. First, they pass indications of incoming marking and spacing signals to discriminator 6 and, second, they provide a continuous oscillating tone to converter 8, for reasons described hereinafter. This continuous tone is therefore provided to converter 8 for both marking and spacing signals and, in addition, in the absence of incoming data signals so long as power is derived from telephone line 1.

Discriminator 6 provides the familiar "S-curve" frequency response, passing on to output lead 25 appropriate output voltages corresponding to the incoming marking and spacing tones. It is noted at this point that the output of discriminator 6 is developed across a ground return which is the ground return of the local station. This ground is shown in the drawing and specifically in discriminator 6, for example, by the conventional ground symbology. It is further noted and described in detail hereinafter that the output of discriminator 6 is isolated from the input and, therefore, isolated from the power supplied by the incoming telephone line. Accordingly, the output of discriminator 6 comprises appropriate mark and space data signals, which are signal voltages developed with respect to the local ground. Specifically, discriminator 6 applies a positive voltage with respect to the local ground to lead 25 when a spacing tone is on lead 20 and applies a negative voltage with respect to the local ground to lead 25 when a marking tone is on lead 20.

The marking and spacing signal voltages on lead 25 are passed to the data switch, generally indicated by block 7. Data switch 7 in response to the signal voltages opens and closes electronic data switches, thus passing supply voltages from lead 26 or lead 27 to output lead 28. Output lead 28 has thus applied thereto supply voltages derived from leads 26 and 27 in accordance with the signal voltages on input lead 25. As disclosed hereinafter, the voltage on lead 26 is positive with respect to the local station ground and the voltage on lead 27 is negative with respect to the local station ground. Data switch 7 is operated in response to an incoming positive spacing signal on lead 25 to pass the positive voltage potential on lead 26 to lead 28 and is operated in response to an incoming negative marking signal on lead 25 to pass the negative voltage potential on lead 27 to output lead 28. The marking and spacing signals on lead 28 are then supplied to local equipment, not shown, for recording the incoming data signals received over telephone line 1.

As previously stated, the supply voltages on leads 26 and 27 are positive and negative, respectively, with respect to the local ground. These voltages are derived from the output of converter 8, and converter 8, in turn, obtains its input from locked oscillator 5 which, in turn, derives its energy from telephone line 1 via regulator circuit 2. It is recalled that converter 8 has applied thereto the alternating current or tone signals applied to lead 19 by locked oscillator 5. These tone signals are applied across converter 8 to common return line 12. The appropriate voltage supply is applied to converter 8 by lead 17. Converter 8 functions to convert the A.C. tone to appropriate D.C. signals, utilizing for this purpose an AC-to-DC converter arrangement for isolating the input of converter 8 from the output thereof. The input section of converter 8 is arranged as an alternating switch device to develop the full voltage swing between voltage supply leads 12 and 17 under control of the tone signal from locked oscillator 5. This alternating voltage is then rectified and converted to D.C. voltages with respect to local ground and therefore isolated from the telephone line. Accordingly, locked oscillator 5 and converter 8 operate as a DC-to-AC-to-DC converter, with the output of the converter isolated from the input and the input developing its energy from the power supply derived from telephone line 1 by way of regulator circuit 2. Positive voltages with respect to local ground and negative voltages with respect to local ground are thus developed by leads 26 and 27, respectively. These voltages are then utilized by data switch 7, as previously described, to provide appropriate output signal voltages to output lead 28. The result, therefore, is to provide to lead 28 voltage signals derived from, but isolated from, the power supply derived from the telephone line 1.

Considering now the details of each circuit shown in block 4, and starting with regulator circuit 2, it is seen that tip lead T of telephone line 1 and input lead 21 extend to a diode bridge comprising diodes CR1 through CR4. It is recalled that lead 21 is connected to ring lead R via transformer T1. The central office battery on telephone line 1 is therefore applied across breakdown diode CR5 and reversely poled diodes RV1 and RV2 by the diode bridge. Capacitor C1, connected across diodes CR5, RV1 and RV2, filters the supply voltage. The function of the diode bridge is to serve as a polarity guard to insure that line current is always passed in the same direction through breakdown diode CR5 and reversely poled diodes RV1 and RV2. It is conventional telephone practice to reverse the polarity of the line during certain supervisory signaling periods.

In accordance with the embodiment disclosed herein, approximately eight volts is developed across breakdown diode CR5 when line current passes therethrough. The passage of line current through reversely poled diodes RV1 and RV2 develops approximately two volts across these diodes. Therefore, the voltage drop between lead 17 and lead 12 is approximately ten volts and between lead 16 and lead 12 is approximately two volts. Capacitor C2 serves to filter the voltage supply on lead 16. Therefore, with lead 12 tied to the "pseudo" ground of telephone line 1, lead 16 has developed thereon a positive two volt supply and lead 17 has developed thereon a positive ten volt supply.

Filter 3 may comprise any conventional filter which acts to pass signals within the signaling band of the data signal and filters out noise and other undesirable signals. Filter 3, therefore, passes to lead 15 the superimposed A.C. tone signals from telephone line 1.

Lead 15 from filter 3 extends to the base of transistor Q1 in tuned amplifier 4 Transistor Q1, together with its immediate parameters is a voltage feedback amplifier arranged to have a low input and a low output impedance. The voltage supply from lead 17 is provided to the emitter of transistor Q1 by way of resistor R1, with shunting capacitor C16 acting as an alternating current bypass. The amplified signal appearing at the collector of transistor Q1 is passed by way of resistor R2 to the base of transistor Q2. This signal is band limited by the tuned circuit consisting of inductor L1 and capacitor C2 which attenuates noise lying outside the signal spectrum.

Transistor stage Q2 is a high gain direct coupled amplifier. The collector battery supply is passed from lead 17 through resistor R3 and, in parallel, through the primary of transformer T2 in locked oscillator 5 by way of leads 18 and 22, the impedance of the winding being controlled by the reflected secondary impedance of the transformer. Capacitor C6 and reversely poled diodes RV4, which are connected across leads 18 and 22, limit the alternating current output signal when the input of transistor stage Q2 exceeds a predetermined threshold. The output of tuned amplifier 4 is thus provided across output leads 18 and 22 to the primary of transformer T2 in locked oscillator 5.

The secondary of transformer T2 in locked oscillator 5 is connected between the base of transistor Q3 and the voltage supply lead 16 by way of inductor L2. Transistor Q3 is arranged as a Colpitts-type oscillator whose frequency is determined primarily by the tank elements which comprise inductor L2 and capacitors C7 and C18. Reversely poled diodes RV5 act to limit the amplitude of the oscillator output. The alternating current signal from the previous stage is, of course, coupled to the base of transistor Q3 by way of the secondary of transformer T2. In this manner the oscillator is "frequency locked" to the frequency of the injected input which differs slightly from the oscillator's natural rest frequency. In accordance with the specific arrangement herein, the oscillator's rest frequency is arranged to be closer to the marking frequency, which is the higher frequency, than to the spacing frequency. In this manner the locked oscillator provides high gain, inherent filtering property and an output alternating current signal frequency-locked to input signals and at a natural rest frequency in the absence of input signals.

The collector of transistor Q3 provides the output for locked oscillator 5. The locked oscillator output signals are therefore passed to output lead 19 and then to converter 8 and, in addition, to discriminator 6 by way of lead 20. Lead 20 extends in discriminator 6 through the primary windings of transformers T3 and T4 to battery supply lead 17. (It is noted that this connection to battery supply lead 17 provides the appropriate power supply for transistor Q3.) The primaries of transformers T3 and T4, in conjunction with capacitors C4 and C3, form tank circuits which are tuned to resonate in the vicinity of the marking and spacing frequencies, respectively. Diodes CR6, CR7, CR8 and CR9 are connected to the secondaries of the transformers and rectify the signals from the secondaries to charge capacitors C8 and C9. Due to the poling of diodes CR6, CR7, CR8 and CR9, the rectified signals are subtracted and the resulting signal is then passed by the low-pass filter formed by the combination of inductor L3 and capacitor C10 to output lead 25, thereby forming the familiar "S-curve" frequency response. Specifically, diodes CR6 and CR7 respond to a spacing frequency to charge capacitor C8 and thus pass a positive voltage signal to output lead 25 and diodes CR8 and CR9 respond to a marking frequency to charge capacitor C9 to pass a negative voltage signal to output lead 25. It is noted that the common return of the output side of discriminator 6 is connected to the local station ground and, more specifically, the center tap of the secondary of transformer T3 and the lower plates of capacitors C9 and C10 are connected to this ground. Accordingly, the output voltages of discriminator 6 are positive and negative with respect to the local station ground.

In the absence of an incoming signal on the telephone line, locked oscillator 5 idles near the marking frequency, as previously described. Discriminator 6, and more specifically the primary winding of transformer T3 and capacitor C4, are arranged to develop a sufficiently high impedance to this frequency to develop a signal across the secondary of transformer T3. The signal is rectified by diodes CR8 and CR9 providing a negative signal to lead 25. Accordingly, discriminator 6 provides a "mark-hold" function, applying a negative voltage marking signal to its output in the absence of a received data signal.

Summarizing the operation of discriminator 6, transformers T3 and T4 and the associated circuits therein act to detect the incoming marking and spacing frequencies and provide output signal voltages in accordance therewith. These signal voltages are applied to output lead 25 and comprise positive spacing and negative marking signals, which signals are developed with respect to the local station ground.

Lead 25 extends to the bases of transistors Q4 and Q5 in data switch 7. The positive spacing voltage on lead 25 acts to turn ON transistor Q4 and turn OFF transistor Q5 while the negative marking voltage acts to turn ON transistor Q5 and turn OFF transistor Q4. Transistor Q4 ON, in turn, acts to turn ON transistor Q6 while transistor Q5 acts to turn ON transistor Q7. The collectors of transistors Q6 and Q7 are connected in common to output lead 28. The emitters of transistors Q6 and Q7 are connected to leads 26 and 27, respectively. Leads 26 and 27 extend from the output of converter 8.

It is recalled that the alternating current output from locked oscillator 5 is applied to converter 8 by way of lead 19. Lead 19 extends to the base of transistor Q8, which acts as a switching stage. The emitter of transistor Q8 is directly connected to voltage supply lead 17. The collector of transistor Q8 is connected to common return lead 12 by way of a voltage divider comprising resistors R6 and R7. The alternating current output of locked oscillator 5 alternately turns ON and turns OFF transistor Q8 and the output switching signals are passed to the base of transistor Q9 since the base is connected to the junction of resistors R6 and R7. Transistor Q9 is, therefore, driven between saturation and cutoff.

The collector lead of transistor Q9 is connected through the primary of transformer T5 and resistor R9 to voltage supply lead 17. The secondary of transformer T5 drives diodes CR12 and CR13. This develops D.C. potentials across capacitors C13 and C14. Since the local station ground is connected to capacitors C13 and C14 and to the center tap of transformer T5, a negative voltage supply with respect to the local ground is developed across capacitor C13 by diode CR12 and passed to output lead 27 while a positive voltage supply is developed across capacitor C14 by diode CR13 and passed to output lead 26. It is, therefore, seen that converter 8 generates supply voltages derived from the energy from the central office battery by way of telephone line 1 but isolated from the "pseudo" ground of the telephone line. In addition, these supply voltages comprise positive and negative voltages with respect to the local station ground.

The positive and negative voltages on leads 26 and 27 are passed to output lead 28 in accordance with the operations of transistors Q6 and Q7. Specifically, when a spacing signal is being received, transistor Q6 is turned ON to present a low emitter-to-collector impedance. The positive potential on lead 26 is therefore passed through the emitter-to-collector path of transistor Q6 to output lead 28. Conversely, when a marking signal is being received, transistor Q7 is turned ON and the negative potential on lead 27 is pased through the emitter-to-collector path of transistor Q7 to output lead 28. The local station is, therefore, provided with marking and spacing voltage signals which utilize energy provided by but isolated from the incoming telephone line.

Although a specific embodiment of this invention has been shown and described, it will be understood that various modifications may be made without departing from the spirit of this invention.

What is claimed is:

1. In a signal receiver, signal detector means including alternating signal generating means responsive to incoming signals, output signal producing means responsive to the alternating signal, a first source of D.C. power for providing energy for the signal generating means, and a second source of D.C. power for providing energy for the output signal producing means, the power of said second source being derived from said first source of power by way of a converter characterized in that the converter includes said alternating signal generating means and rectifying means coupled to the output of the alternating signal generating means for rectifying the alternating signal.

2. In a signal receiver in accordance with claim 1, wherein the converter further includes means for precluding D.C. coupling the output of the alternating signal generating means to the rectifying means whereby the second source of D.C. power is isolated from the first source of D.C. power.

3. In a signal receiver in accordance with claim 2, wherein the precluding means comprises a transformer for A.C. coupling the alternating signal generating means to the rectifier means.

4. In a signal receiver in accordance with claim 2, wherein the alternating signal generating means comprises an oscillator locked to the frequency of the incoming signals.

5. In a signal receiver in accordance with claim 2 wherein said output signal producing means includes means for precluding D.C. coupling to the output of said alternating signal generating means whereby the signal output of said output signal producing means is isolated from the first source of D.C. power.

6. A batteryless telephone line receiver for detecting signals which are superimposed on the central office battery line current comprising a regulator circuit for producing D.C. power from the line current, means for detecting the superimposed signal and producing A.C. signals in accordance therewith, said detecting means deriving its energy from the regulator circuit produced D.C. power, output signal producing means for providing signal voltages in response to the A.C. signals produced by said detecting means, said signal voltages being derived from a local source of D.C. power, converter means for producing said local source of D.C. power, said converter means comprising rectifying means for converting an A.C. wave to D.C. power and coupling means for passing the A.C. signal output of said detecting means to said rectifying means, said coupling means including means for precluding D.C. coupling the detecting means output to said rectifying means input whereby the local source of D.C. power is isolated from the central office battery although deriving its power from the central office line current.

7. A batteryless telephone line receiver in accordance with claim 6 wherein said output signal producing means includes means for precluding D.C. coupling to the output of said detecting means whereby the signal voltages provided by the output signal producing means are isolated from the central office battery.

No references cited.

KATHLEEN H. CLAFFY, Primary Examiner

T. D'AMICO, Assistant Examiner